(12) United States Patent
Aguirre et al.

(10) Patent No.: US 6,195,531 B1
(45) Date of Patent: Feb. 27, 2001

(54) METHOD AND SYSTEM FOR AUTOMATIC CONFIGURATION OF FIXED CELLULAR TERMINALS

(75) Inventors: Fernando Aguirre, Getxo-Vizcaya; Alberto Irizar, Durango-Bizkaia; Alberto Ruiz, Bilbao-Bizkaia, all of (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/199,595

(22) Filed: Nov. 25, 1998

(51) Int. Cl.$^7$ ........................................ H04B 7/15
(52) U.S. Cl. .................... 455/11.1; 455/426; 379/338
(58) Field of Search ................... 455/11.1, 426, 455/422, 445, 403, 411; 379/56.3, 55.1, 338, 387

(56) References Cited

U.S. PATENT DOCUMENTS

| | | | |
|---|---|---|---|
| H1641 | 4/1997 | Sharman | 455/466 |
| 5,564,072 | 10/1996 | Aguilera et al. | 455/422 |
| 5,715,523 * | 2/1998 | Reynolds | 455/410 |
| 5,724,656 | 3/1998 | Vo et al. | 455/422 |
| 5,806,005 * | 9/1998 | Hull et al. | 455/566 |
| 5,854,976 * | 12/1998 | Aguilera et al. | 455/411 |
| 5,905,950 * | 5/1999 | Anell | 455/421 |
| 6,073,028 * | 6/2000 | Humphrey et al. | 455/553 |
| 6,125,283 * | 9/2000 | Kolev et al. | 455/552 |

FOREIGN PATENT DOCUMENTS

| | | |
|---|---|---|
| 102260 | 8/1999 | (EP) . |
| WO 96/21327 | 7/1996 | (WO) . |
| WO 98/27749 | 6/1998 | (WO) . |

OTHER PUBLICATIONS

*Fixed Cellular Access* by J.M. Garcia Aguilera, XP000544985; Electrical Communication, Jan. 1, 1995; pp. 43–46.

\* cited by examiner

Primary Examiner—Reinhard J. Eisenzopf
Assistant Examiner—Eliseo Ramos-Feliciano
(74) Attorney, Agent, or Firm—Jenkens & Gilchrist, P.C.

(57) ABSTRACT

A method and system enables a fixed cellular terminal (FCT) to be automatically configured to accommodate landline phones of the country and/or landline network in which it is physically located. The FCT includes a memory and a data structure therein. The data structure includes instructions on how landline phones interface with Public Switched Telephone Networks (PSTNs). Consequently, the FCT may be connected to a landline phone in any country and/or landline network once the FCT is informed of the country and/or landline network in which it is being used. According to one embodiment, a Subscriber Identity Module (SIM), which is needed to activate cellular phones in some systems, is used to inform the FCT of the country and/or landline network. Specifically, the FCT may extract the Mobile Country Code (MCC) and the Mobile Network Code (MNC) from the SIM in order to determine the country and/or mobile network in which it is operatively installed and therefore the associated landline network in which it is physically located and thus the corresponding landline phone interface to be implemented by the FCT.

22 Claims, 3 Drawing Sheets

METHOD AND SYSTEM FOR AUTOMATIC CONFIGURATION OF FIXED CELLULAR TERMINALS

BACKGROUND OF THE INVENTION

1. Technical Field of the Invention

The present invention relates in general to the field of communications, and in particular, to a system and method for enabling a fixed cellular terminal (FCT) to activate appropriate landline parameters automatically.

2. Description of Related Art

Cellular telephone (or, more broadly, wireless) systems provide an attractive alternative to conventional wire-based (e.g., landline) telephone systems, especially in connection with the provision of new or expanded telephone service in heavily populated or remote areas where significant increases in demand are or have been encountered. The expense, aggravation, and time involved in acquiring rights of way and establishing the infrastructure to provide telephone service are substantially reduced with the installation and use of a cellular telephone system. However, the mobility advantage of cellular telephone systems, which is accounted for in the increased subscriber cost of the service, is often a feature that many telephone service users do not want to pay for or necessarily need.

Accordingly, efforts have been made to couple wireless systems with conventional analog telephones (e.g., those 2-wire phones used for providing Plain Old Telephone Service (POTS)) and to provide a hybrid telephone system wherein hybrid telephone devices are fixed at certain locations as in a wire-based system but instead provide telephone service using radio frequency communications in a wireless environment. Such systems, conventionally referred to as fixed cellular systems, interface a conventional POTS telephone, like those used in wire-based telephone systems, with a radio frequency transceiver, like those used in mobile stations (MSs) operating within wireless systems. The primary advantages of fixed cellular systems are (i) the reduction of the costs and hassles of acquiring rights of way and of laying or stringing telephone cables and (ii) the ease and swiftness with which the system may be installed and made operational. The availability of a fixed cellular system thus offers service providers a tool for quickly reacting to increases in demand at a reasonable provider and subscriber expense.

Conventional FCTs, however, increase costs for service providers because significant time and expense are invested into programming each FCT for interfacing with the POTS telephones of the Public Switched Telephone Network (PSTN) that is associated with a given geographical area in which the FCT will be physically located. Each PSTN around the world defines a set or collection of parameters governing how a standard POTS telephone connects to and operates within the PSTN. Such a set or partial set of parameters can be termed a line interface (LI) protocol (LIP) that each POTS telephone incorporates to accommodate the particular country and/or network in which the POTS telephone will be used. With conventional FCTs, each FCT undergoes an expensive customization process in which the appropriate LIP is programmed either at the factory or at the premises of the customer. It would be beneficial for both manufacturers and service providers if the expenses of the aforementioned customization process could be reduced or eliminated.

SUMMARY OF THE INVENTION

The deficiencies of the prior art are overcome by the method and system of the present invention. For example, as heretofore unrecognized, it would be beneficial for both manufacturers and service providers if FCTs were capable of automatic configuration of LIPs. In fact, it would be beneficial if FCTs could be automatically configured according to the LIP of the PSTN in which they are to be physically located.

An FCT provides telephone access to standard POTS phones via a Public Land Mobile Network (PLMN). The FCT accesses the PLMN with a wireless connection in a manner analogous to a standard MS. However, the FCT differs from a standard MS by providing one or more inputs for connecting standard POTS telephones. The FCT, therefore, preferably communicates with standard POTS telephones according to the LIP of the PSTN that the relevant POTS telephone is designed to work in.

LIPs typically differ from one PSTN to another PSTN. Thus, the FCT preferably uses the LIP of the PSTN of the area in which it is physically located. According to the principles of the present invention, the FCT includes the LIPs of many, if not all, of the PSTNs around the world, especially those PSTN areas into which the FCT may possibly be physically located. The FCT is therefore prepared (e.g., at the factory) to provide the requisite LIP for any standard POTS telephone. According to the principles of the present invention, the FCT is automatically configured by determining, selecting, and activating the appropriate LIP for the standard POTS telephone(s) that will be connected to it.

According to one embodiment of the invention, information stored in a Subscriber Identity Module (SIM) card is used by the FCT to determine the appropriate LIP. A GSM-type SIM card, for example, includes a country code (e.g. the Mobile Country Code (MCC)) and a network code (e.g., the Mobile Network Code (MNC)). The country code and, if necessary, the network code can be used to uniquely determine the associated PSTN in which the FCT is designed to provide service. The FCT may then select and activate the LIP corresponding to the uniquely-determined PSTN.

An important technical advantage of the present invention is that it enables FCTs manufactured according to one LIP collection to be physically located within many different PSTN areas without special LIP pre-programming.

Another important technical advantage of the present invention is the ability to easily select an appropriate LIP after installation of an FCT.

Yet another important technical advantage of the present invention is that it provides an efficient method and system for automatically configuring FCTs based on received information, such as information retrieved from a SIM card.

Yet another important technical advantage of the present invention is the ability to activate an appropriate LIP based on the country and/or network/operator information in a GSM-type SIM card.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE DRAWINGS

A preferred embodiment of the present invention and its advantages are best understood by referring to FIGS. 1–6 of the drawings, like numerals being used for like and corresponding parts of the various drawings.

Figure 1:
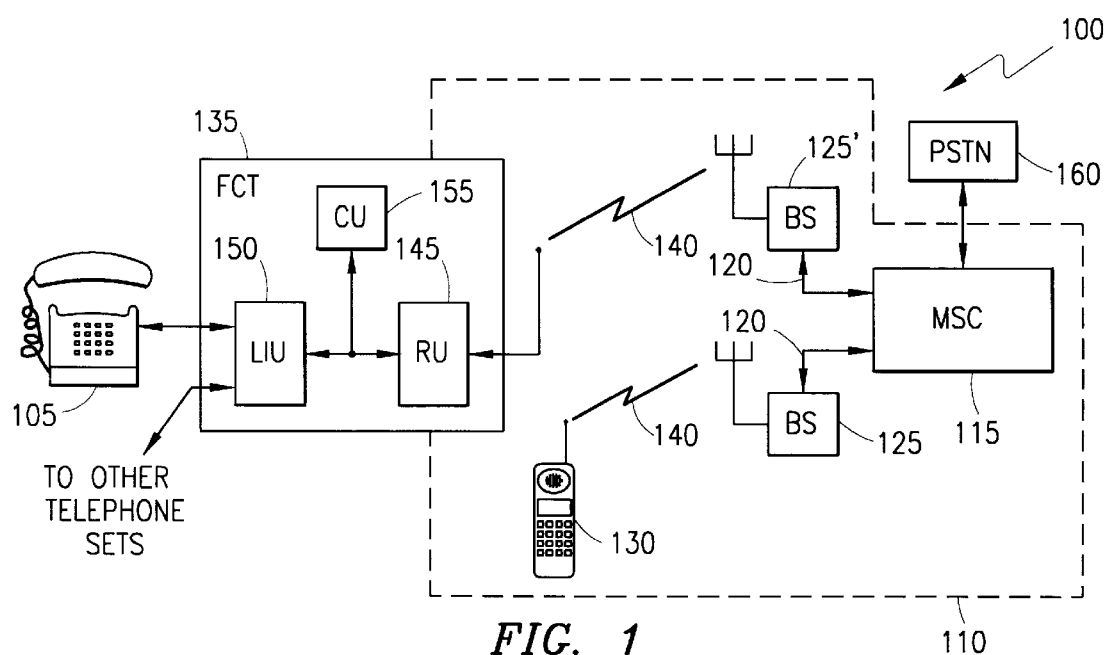
FIG. 1 illustrates a block diagram of an exemplary fixed cellular telephone system in which the present invention may be advantageously applied.

Referring now to FIG. 1, a block diagram of an exemplary fixed cellular telephone system in which the present invention may be advantageously applied is illustrated. The fixed cellular telephone system 100 includes a standard telephone set (e.g., a POTS phone) 105, which is connected for operation to a cellular telephone network (e.g., a PLMN or, more generally, a wireless network) 110. The wireless network 110 includes a Mobile Services Switching Center (MSC) 115 connected by communications links 120 to multiple base stations (BSs) 125 and 125'. The MSC 115 is also connected to a PSTN 160. The connection between the POTS phone 105 and the wireless network 110 is made through an FCT 135, which operates to establish radio frequency communications links with a proximately located base station 125'.

The radio frequency communications links established (i) between the BSs 125 and any cellular MSs 130 and (ii) between the BS 125' and the FCT 135 are effectuated over an air interface 140 supporting both plural logical control channels (CCs) and plural logical traffic channels (TCs). The CCs comprise bi-directional communications channels for carrying command and control signals (i) between the BSs 125 and the MSs 130 and (ii) between the BS 125' and the FCT 135. The TCs, on the other hand, comprise bi-directional communications channels for carrying voice/data communications (i) between the BSs 125 and the MSs 130 and (ii) between the BS 125' and the FCT 135. Any type of cellular network air interface 140 that provides for both control and traffic channels may be utilized by the wireless network 110, including those air interfaces specified for use in the well known Digital-Advanced Mobile Phone Service (D-AMPS) and Global System for Mobile Communications (GSM) cellular telephone systems.

The FCT 135 operates as an interface between one or more POTS phones 105 and the wireless network 110. When operable as a multi-line terminal, the FCT 135 functions like a private branch exchange (PBX) to allow a plurality of subscriber (e.g., POTS) telephone sets at one general location (e.g., a business or a small town) to be provided with fixed cellular telephone service. As a single-line terminal, on the other hand, the FCT 135 provides a connection for a single subscriber telephone set at one given location (e.g., a house). The FCT 135 may accordingly include, for example, either a Single-line or Multi-line Terminal for the GSM-based fixed cellular telephone system configured in accordance with the principles of the present invention to provide an improved LIP configuring technique as will be described.

The exemplary FCT 135 includes three main logical blocks: a radio unit (RU) 145, a line interface unit (LIU) 150, and a control unit (CU) 155. These logical blocks may be, e.g., software or hardware implemented. The radio unit 145 provides all the radio frequency communications functionality typically found in an MS 130 for a cellular telephone system. Thus, the RU 145 includes a tunable radio frequency transceiver device for accessing the radio frequency carriers (and the digital cellular system TDMA or CDMA time slots therein, if applicable) for the control channels and the voice channels provided within the air interface 140. The LIU 150 provides the functionality for interfacing the one or more connected POTS telephone sets 105 to the RU 145. Among other functions, the CU 155 manages the operation of the RU 145 and the LIU 150 to provide the signal conversions required to establish and terminate calls to and from the LIU 150 through the wireless network 110. The CU 155 further manages all the necessary information required for establishing and authenticating calls over the wireless network 110.

For the FCT 135 to optimally operate as the interface between the POTS telephone(s) 105 and the wireless network 110, the FCT 135 preferably interacts with the POTS phone 105 using the LIP for which the POTS phone 105 was designed. The FCT 135 provides a PSTN-like 2-wire interface for regular POTS analog phones 105. From the perspective of a user, the interface from the FCT 135 is equivalent to the standard wireline PSTN of the country where the FCT is physically located. The FCT 135 preferably matches the LIP to that of the resident country and (if necessary) PSTN. Typically, LIP characteristics of all the different PSTNs of the countries of the world are usually different.

Figure 2:
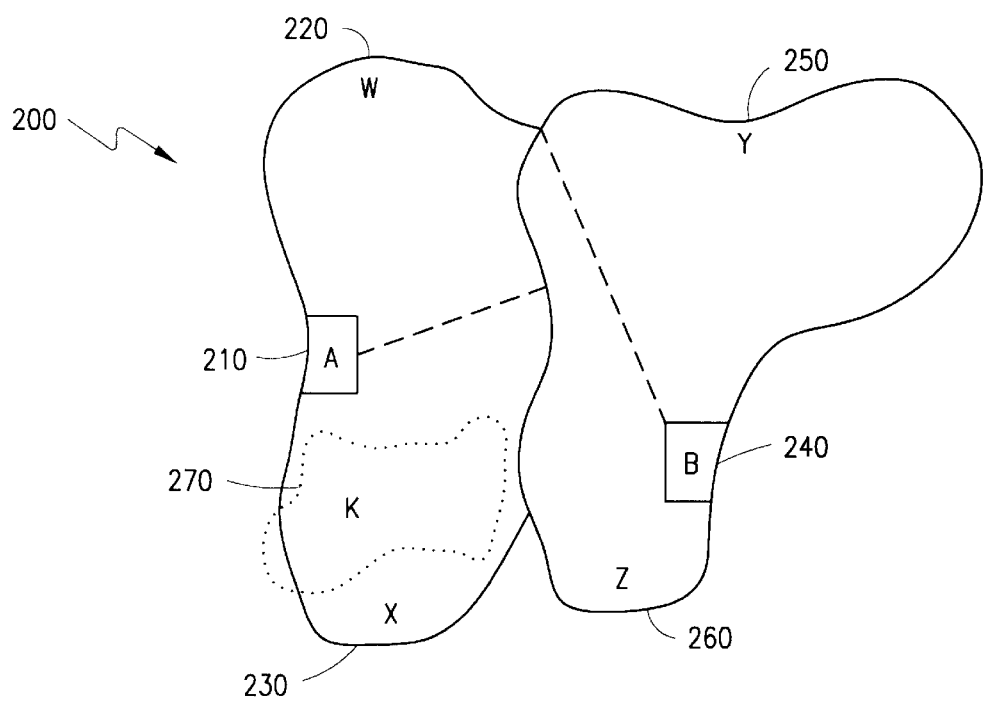
FIG. 2 illustrates a block diagram of two exemplary countries with more than one telephone network.

Referring now to FIG. 2, a block diagram of two exemplary countries with more than one telephone network is illustrated. The two countries are denoted generally by 200. A country A 210 is divided into two networks, a network W 220 and a network X 230. The country A 210 can, however, be divided into fewer or more than two networks. Likewise, a country B 240, which borders the country A 210 in this example, is divided into two networks, a network Y 250 and a network Z 260. The country B 240 can also, however, be divided into fewer or more than two networks. It should be noted that the networks W 220, X 230, Y 250, and Z 260 of element 200 represent exemplary PSTN networks. Also shown is an exemplary wireless network K 270 (e.g., a PLMN) that is substantially within the network X 230. It should be understood that the invention is applicable to more than two countries of the world, and it may be implemented by accommodating all possible country and/or network combinations. Each country and/or network of element 200 may be operating under a different LIP.

Thus, according to the principles of the present invention, the FCT preferably acquires information relating to/indicative of the country and/or landline network in which the FCT is physically installed (e.g., geographically located/installed). In so doing, the FCT is able to emulate a PSTN LI of the country and/or PSTN network in which the FCT is physically/geographically installed while the FCT is actually operatively connected to a PLMN network. In other words, according to a preferred embodiment, the FCT directly acquires information that specifies the PLMN to which and in which the FCT is (or at least is intended to be) operatively connected and functioning. The FCT uses this direct information to "infer" which PSTN area it is physically located within by determining which PSTN area is associated with the PLMN to which it is operatively connected. The FCT may then emulate the LI of the PSTN associated with the PSTN area in which the FCT is physically, but not necessarily electrically or operatively, installed. Thus, although it may be considered that the FCT is physically installed within a PSTN area, the FCT is communicatively and operatively installed within a PLMN.

In a GSM network, for example, a subscriber is established by inserting a SIM card or plug-in into a GSM-type MS. The SIM card, by way of example only and not of limitation, is portable and may be used in different MSs. The SIM card defines and stores all the subscriber data needed by the MS for operating in a GSM network (e.g., subscriber number, operator ID, etc.). Among those parameters defined and stored within a SIM card are the MCC, which is a numeric prefix that defines the country associated with the home PLMN of the SIM card, and the MNC, which is another numeric number that defines the network that is the home PLMN of the SIM card. In non-GSM systems, a SIM card may include, in addition to or instead of the network code, an indication of the operator of the system to which the user subscribes. In the GSM system, the MCC is a 3 digit code and the MNC is a 2 digit code. This MCC and MNC pair of parameters uniquely defines the country and the operator where the SIM card is to be used.

Figure 3:
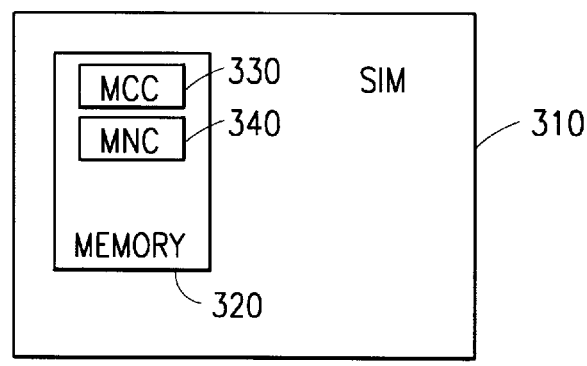
FIG. 3 illustrates a Subscriber Identity Module, for example a conventional SIM, that can be used with one embodiment of the present invention.

Referring now to FIG. 3, a Subscriber Identity Module, for example a conventional SIM, that can be used with one embodiment of the present invention is illustrated. SIM card 310 includes a SIM memory 320 that is capable of storing all the information needed by the subscriber to operate a GSM-type MS in a GSM network. The SIM memory 320 includes memory locations for the MCC 330 and the MNC 340. However, the principles of the present invention are not limited to GSM wireless networks. For example, this SIM embodiment of the present invention is equally applicable to any system for which the adhered-to standard incorporates an ability to transfer a subscriber's data from one MS to another MS.

Figure 4:
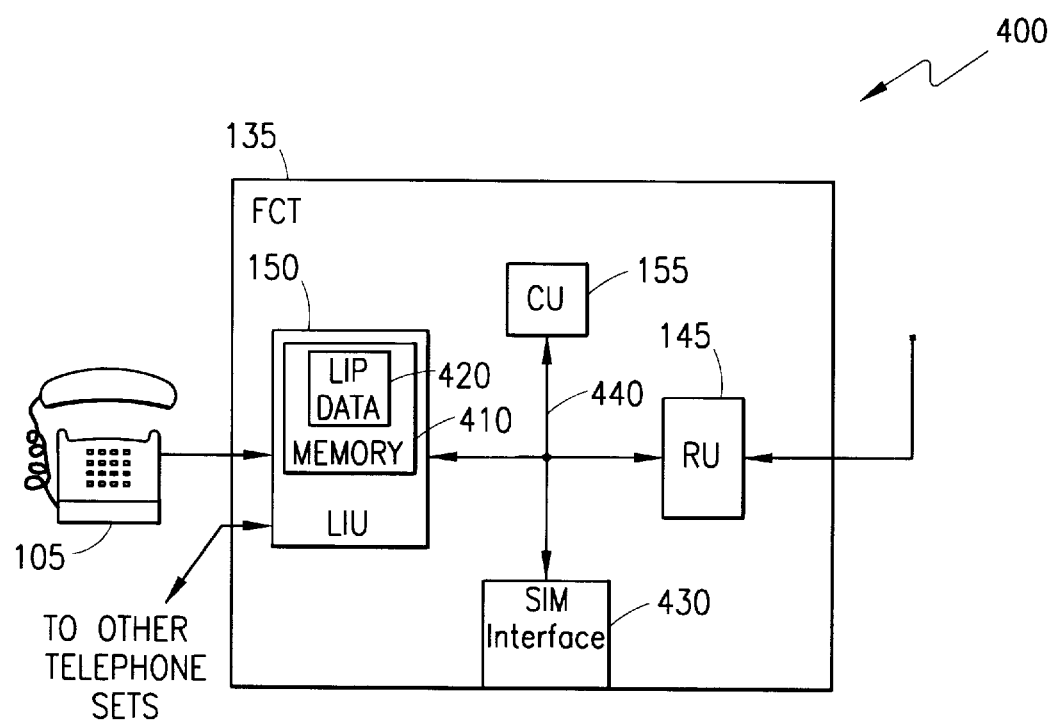
FIG. 4 illustrates an example of a fixed cellular terminal that incorporates principles of the present invention.

Referring now to FIG. 4, an example of a fixed cellular terminal that incorporates principles of the present invention is illustrated. The FCT 135 and multiple POTS phones 105 are designated generally by number 400. The LIU 150 includes a LIU memory 410. It should be understood that the inclusion of the LIU memory 410 within the LIU 150 is exemplary only; such memory may be located elsewhere, such as connected to or incorporated into the CU 155. The LIU memory 410 stores, according to the present invention, LIP data 420 that defines, for example, conventional line interface protocols (LIPs). The LIP data 420 may include an LIP data set of the LIP for each network/operator in each country all over the world, or at least the LIP for those areas in which the FCT 135 may potentially be physically/geographically installed. The LIP data 420 may be in the format of, e.g., a database, a data structure, etc.

The FCT 135 also includes a SIM interface 430 in which the SIM card 310 may be inserted. The SIM interface 430 and the LIU 150 (and hence the LIP data 420 of the LIU memory 410) are connected via a data connection path, such as the FCT internal connection 440. The LIU 150 may access the SIM card 310 in the SIM interface 430 via the FCT internal connection 440 in order to retrieve the MCC 330 and the MNC 340 for subsequent comparison with the LIP data 420. The LIU may select the appropriate LIP based on the comparison. Thereafter, any one or many of the multiple POTS phones 105 may communicate through the wireless network 110 (of FIG. 1) via the LIU 150 of the FCT 135 using the appropriate LIP for the network/operator and country in which the FCT 135 is physically/geographically installed. The FCT 135 is thus appropriately configured for use by POTS phones 105 automatically.

Figure 5:
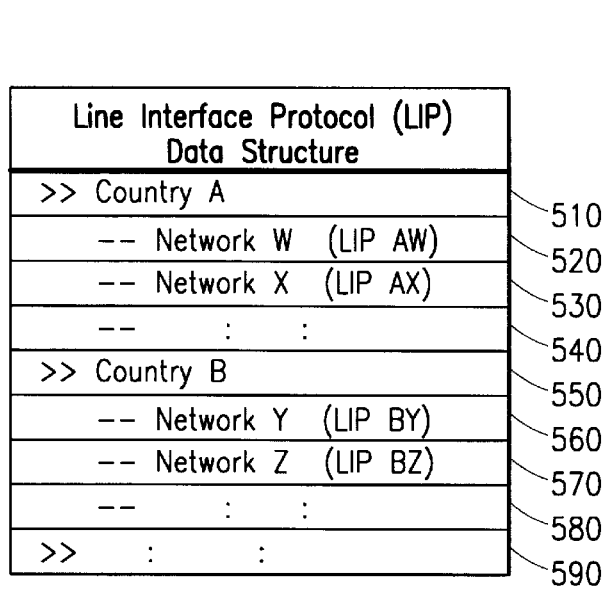
FIG. 5 illustrates an example of a line interface protocol data structure that may be employed in the fixed cellular terminal of FIG. 4 in accordance with the present invention.

Referring now to FIG. 5, an example of a line interface protocol data structure that may be employed in the fixed cellular terminal of FIG. 4 in accordance with the present invention is illustrated. The LIP data 420 (of FIG. 4) may be organized as the LIP data structure 500. In the LIP data structure 500, each country is included in a first hierarchy (denoted by ">>"). For each country in the first hierarchy, one or more PSTN network/operator entries may be included in a second hierarchy (denoted by "--") For each PSTN network/operator entry, an LIP is provided in the LIP data structure 500. It should be noted that for countries with only one PSTN network/operator, the LIP may be provided at the first hierarchy level. It should be understood that the LIP data 420 may be organized in a myriad of other fashions (in addition to the LIP data structure 500) without departing from the scope of the present invention.

With reference to both FIG. 5 and FIG. 2, the LIP data structure 500 includes a country A entry 510 at the first hierarchy level. At the second hierarchy level under the country A entry 510, a network W entry 520 provides an "LIP AW" (an LIP for the network W 220 of the country A 210), and a network X entry 530 provides an "LIP AX" (an LIP for the network X 230 of the country A 210). According to one embodiment, then, the MNC 340 of the wireless network K 270 that is associated with the network X 230 is included as part of (or at least linked to) the network X entry 530. An additional network entry 540 for the country A represents that additional networks may be included under the country A entry 510. The LIP data structure 500 also includes a country B entry 550 at the first hierarchy level. At the second hierarchy level under the country B entry 550, a network Y entry 560 provides an "LIP BY" (an LIP for the network Y 250 of the country B 240), and a network Z entry 570 provides an "LIP BZ" (an LIP for the network Z 260 of the country B 240). An additional network entry 580 for the country B represents that additional networks may be included under the country B entry 550. Also, an additional country entry 590 indicates that additional countries may be included in the LIP data structure 500.

It should be noted that the principles of the present invention are not limited to the MCC 330 and the MNC 340 of the SIM card 310. In fact, the present invention is equally efficacious in the context of any boundaries (e.g., geographical, political, wireless system technology, wireless system network/provider, etc.) that may serve to indicate the LIP(s) that the various standard POTS phones 105, which are to be connected to the FCT 135, are governed by.

Figure 6:
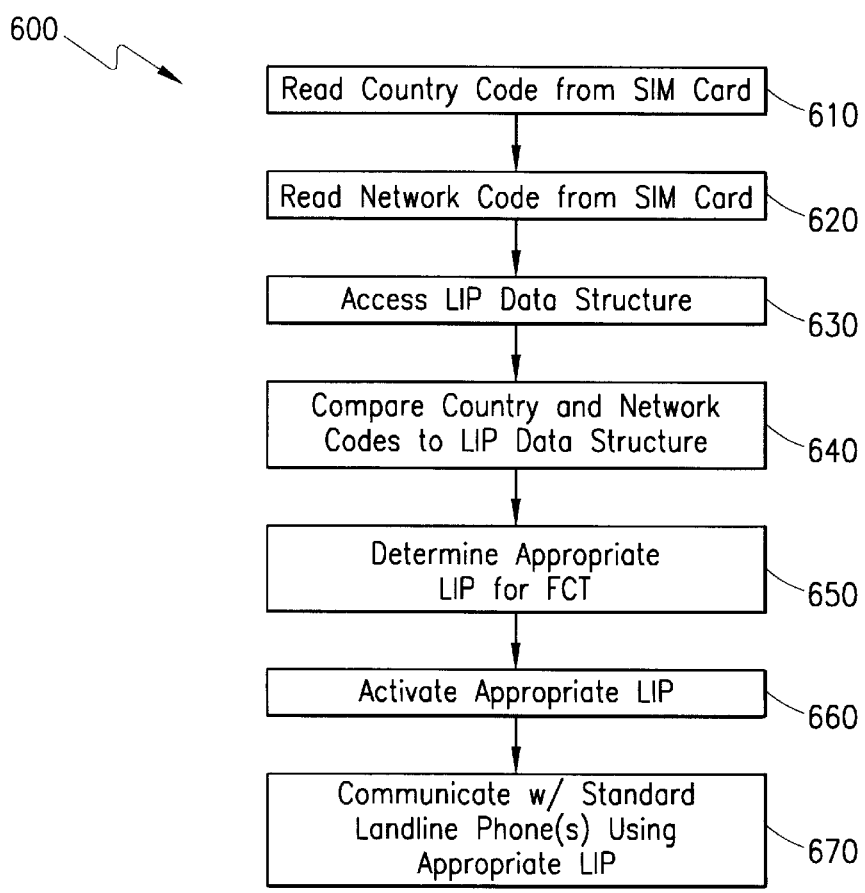
FIG. 6 illustrates a method in flowchart form of one exemplary embodiment of the present invention.

Referring now to FIG. 6, a method in flowchart form of one exemplary embodiment of the present invention is illustrated. The flowchart 600 indicates the steps taken by the system of the present invention according to a SIM card 310 embodiment of the present invention. Initially, after installation of the FCT 135, a SIM card 310 is inserted into the SIM interface 430. The SIM card 310 preferably includes information that (at least indirectly) indicates the PSTN in which the FCT 135 is physically/geographically installed. In this example, the LIP-indicating information corresponds to a country code (e.g., the MCC 330) and a (mobile) network(/operator) code (e.g., the MNC 340). The FCT 135 correlates the information (e.g., which specifies a PLMN for example) to entries that further indicate which LIP to use. In other words, the SIM card 310 preferably includes information that enables the FCT 135 to determine which PSTN to emulate. Accordingly, the LIU 150 reads (e.g., extracts by interrogation) the country code from the SIM card 310 via the FCT internal connection 440 (step 610). The LIU 150 also reads the (mobile) network code from the SIM card 310 via the FCT internal connection 440 (step 620).

The LIU 150 accesses the LIP data structure 500 (or other form of the LIP data 420 in the memory 410) (step 630). It should be noted that the steps of flowchart 600 may be executed in an order other than that enumerated in FIG. 6. For example, the LIU 150 may begin accessing the LIP data structure 500 while it is extracting the country code and prior to receiving the (mobile) network code. After the LIU 150 accesses the LIP data structure 500, the LIU 150 compares the received country and (mobile) network codes to the entries in the LIP data structure 500 (step 640).

The LIU 150 performs the comparison to determine an entry in the LIP data structure 500 that is associated with and/or that corresponds to the received country and (mobile) network codes. The corresponding entry may be, for example, a matching entry, a default entry, etc. When the LIU 150 ascertains a matching entry that matches the country (e.g., the first hierarchy) and the (mobile) network (e.g., the second hierarchy) (if necessary), the LIU 150 has determined an appropriate LIP for the FCT 135 (step 650). The LIU 150 may then select the corresponding LIP. If the LIU 150 cannot find a matching entry (e.g., does not recognize the MCC 330 and/or the MNC 340), then the LIU 150 of the FCT 135 selects an LIP (e.g., a set of line characteristics) that is defined as the default set of line interface protocol characteristics. This default LIP entry (not explicitly shown) may be stored as part of the LIP data structure 500. After the appropriate LIP is determined (in step 650), the appropriate LIP may be activated (step 660). Thereafter, the FCT 135 may communicate in conventional fashion with standard POTS landline telephonets) 105 using the appropriate LIP (step 670).

It should be noted that the method of flowchart 600 may be performed by another component (or jointly by two or more components) of the FCT 135 other than the LIU 150, such as the CU 155. In fact, the method of flowchart 600 may be performed, at least in part, by a controller (e.g., a processor implemented in hardware, software, firmware, or some combination thereof, for example) within the LIU 150, within the CU 155, as part of another controller (not pictured), by a special-purpose controller (also not pictured), or some combination thereof, for example.

By way of example, when the FCT 135 is physically/geographically installed within the network X 230 of the country A 210, a SIM card 310 is inserted into the SIM interface 430. The MCC 330 corresponds to the country code of the country A 210, and the MNC 340 corresponds to the (mobile) network code of the home wireless network (e.g., the wireless network K 270) of the SIM card 310. The home wireless network K 270 may be at least partially geographically coextensive with the associated network X 230. The LIU 150, upon accessing the LIP data structure 500 and comparing the country (e.g., first hierarchy) entries to the country code of the country A 210, focusses on the country A entry 510. Upon comparing the network entries (e.g., the second hierarchy under the country A entry 510) to the network code of the wireless network K 270 that is associated with the network X 230, the LIU 150 focusses on the network X entry 530. The LIU 150 determines that the appropriate LIP for the FCT 135 is the "LIP AX". The "LIP AX" may then be activated.

The principles of the present invention are generally applicable to systems that have accommodations for specifying the requisite configuring information (e.g., the country and network/operator). In other words, once the FCT has been provided with an LIP collection for various PSTNs, the present invention may receive the country and/or network information (or equivalent) from sources other than the SIM card 310 (or, e.g., a SIM plug-in). For example, the country and/or network information could be (i) manually punched into the FCT or (ii) transmitted over a short distance by a wire or a cable, by infrared transmission, by radio frequency transmission (e.g., Bluetooth technology), etc. from a nearby portable computer. While this embodiment is not as automatic a configuring as the SIM embodiment, this embodiment does advantageously eliminate the need to program FCTs individually for each country and/or network in which they are to be physically/geographically installed after the physical/geographical installation location is determined. Alternatively, the FCT can receive the country and/or network information by radio transmission as part of an automatic beacon broadcast, as part of otherwise standard control transmissions of the associated wireless network, or as part of a response to a specific interrogation initiated by the FCT and directed to the associated wireless network, for example in conjunction with an MS-locating algorithm.

Although preferred embodiment(s) of the method and system of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method in a telecommunications system for automatically configuring a fixed cellular terminal, comprising the steps of:

receiving, at said fixed cellular terminal, a first line interface protocol indicator;

comparing, at said fixed cellular terminal, said first line interface protocol indicator to at least one entry of a line interface protocol data set of said fixed cellular terminal; and determining an entry in said line interface protocol data set responsive to said first line interface protocol indicator.

2. The method according to claim 1, further comprising the steps of:

selecting a line interface protocol that is associated with said entry; and activating said line interface protocol that is associated with said entry.

3. The method according to claim 1, further comprising the step of:

communicating with a landline telephone using a line interface protocol that is associated with said entry.

4. The method according to claim 1, wherein said first line interface protocol indicator comprises a country code.

5. The method according to claim 1, further comprising the steps of:

receiving, at said fixed cellular terminal, a second line interface protocol indicator;

comparing, at said fixed cellular terminal, said second line interface protocol indicator to at least one entry of said line interface protocol data set of said fixed cellular terminal; and wherein said step of determining an entry in said line interface protocol data set responsive to said first line interface protocol indicator further comprises the step of determining said entry in said line interface protocol data set responsive to said first and second line interface protocol indicators.

6. The method according to claim 5, wherein said second line interface protocol indicator comprises a network/operator code.

7. The method according to claim 1, wherein said step of receiving, at said fixed cellular terminal, a first line interface protocol indicator further comprises the step of receiving said first line interface protocol indicator by retrieving said first line interface protocol indicator from a subscriber identity module.

8. The method according to claim 1, wherein said step of receiving, at said fixed cellular terminal, a first line interface protocol indicator further comprises the step of receiving said first line interface protocol indicator by wireless transmission from said telecommunications system.

9. The method according to claim 1, wherein said step of comparing, at said fixed cellular terminal, said first line interface protocol indicator to at least one entry of a line interface protocol data set of said fixed cellular terminal further comprises the step of determining that said first line interface protocol indicator is not within said line interface protocol data set;

wherein said step of determining an entry in said line interface protocol data set responsive to said first line interface protocol indicator further comprises the step of determining a default entry; and further comprising the step of selecting a default line interface protocol that is associated with said default entry.

10. A telecommunications system in which a fixed cellular terminal may be automatically configured, comprising:

a memory, said memory including a data set having a plurality of entries and a plurality of line interface protocols corresponding thereto;

a line interface unit, said line interface unit in communication with said memory; and a controller capable of comparing a first received line interface protocol indicator to said data set and of ascertaining a corresponding entry between at least one of said plurality of entries of said data set and said first received line interface protocol indicator.

11. The telecommunications system of claim 10, wherein said line interface unit is capable of selecting and activating the line interface protocol that is associated with said corresponding entry.

12. The telecommunications system of claim 10, wherein said line interface unit is capable of communicating with a wire-based phone using the line interface protocol that is associated with said corresponding entry.

13. The telecommunications system of claim 10, wherein said first received line interface protocol indicator comprises a country code.

14. The telecommunications system of claim 10, wherein said controller is further capable of comparing said first received line interface protocol indicator and a second received line interface protocol indicator to said data set and of ascertaining said corresponding entry between said at least one of said plurality of entries of said data set and both of said first received line interface protocol indicator and said second received line interface protocol indicator.

15. The telecommunications system of claim 14, wherein said second received line interface protocol indicator comprises at least one of a network code and an operator code.

16. The telecommunications system of claim 10, further comprising:

a subscriber identity module interface, said subscriber identity module interface in communication with said controller; and wherein said subscriber identity module interface is capable of providing said first received line interface protocol indicator to said controller from a subscriber identity module.

17. The telecommunications system of claim 10, further comprising:

a transceiver, said transceiver in communication with said controller; and wherein said transceiver is capable of providing said first received line interface protocol indicator to said controller from a wireless transmission.

18. The telecommunications system of claim 10, further comprising:

an infrared port, said infrared port in communication with said controller; and wherein said infrared port is capable of providing said first received line interface protocol indicator to said controller from a short-range infrared link.

19. The telecommunications system of claim 10, wherein said controller is further capable of ascertaining that said first received line interface protocol indicator is not matched in said line interface protocol data set and of selecting a default line interface protocol from said line interface protocol data set.

20. A method in a telecommunications system for automatically configuring a fixed cellular terminal with a subscriber identity module, comprising the steps of:

receiving a country code from said subscriber identity module;

receiving a network code from said subscriber identity module;

comparing said country code and said network code with at least one entry of a line interface protocol data set;

identifying an entry of said line interface protocol data set that corresponds to at least one of said country code and said network code;

determining a line interface protocol associated with said entry of said line interface protocol data set that corresponds to said at least one of said country code and said network code; and implementing said line interface protocol for use by said fixed cellular terminal.

21. A fixed cellular terminal of a telecommunications system that may be automatically configured for use in any of a plurality of public switched telephone networks after being manufactured, comprising:

a data connection path;

a line interface unit connected to said data connection path, said line interface unit adapted to interface with a landline phone, said line interface unit in communication with an electronically-accessible memory, said electronically-accessible memory including a line interface protocol data structure, and said line interface protocol data structure including a plurality of line interface protocols corresponding to said plurality of public switched telephone networks, at least one of said plurality of line interface protocols of said line interface protocol data structure capable of being matched to received information;

a control unit connected to said data connection path, said control unit programmed to control at least some features of said fixed cellular terminal; and a radio unit connected to said data connection path, said radio unit including a transceiver.

22. A fixed cellular terminal, which may be automatically configured to emulate any of a plurality of public switched telephone network line interfaces using a subscriber identity module, that operates in a wireless telecommunications system, comprising:

a data connection path;

a line interface unit connected to said data connection path, said line interface unit adapted to interface with a landline phone, said line interface unit in communication with an electronically-accessible memory, said electronically-accessible memory including a line interface protocol data structure, and said line interface protocol data structure including a plurality of line interface protocols corresponding to said plurality of public switched telephone networks, at least one of said plurality of line interface protocols of said line interface protocol data structure capable of being matched to information in said subscriber identity module;

a radio unit connected to said data connection path, said radio unit including a transceiver; and a subscriber identity module interface connected to said data connection path, said subscriber identity module interface adapted to receive said subscriber identity module.

* * * * *